United States Patent Office 3,457,288
Patented July 22, 1969

3,457,288
PROCESS FOR MANUFACTURING TETRA-
ORGANOLEAD COMPOUNDS
Henry V. Cortez, Corpus Christi, Tex., assignor, by mesne assignments, to PPG Industries, Inc., a corporation of Pennsylvania
No Drawing. Filed Apr. 13, 1966, Ser. No. 542,199
Int. Cl. C07f 7/26
U.S. Cl. 260—437                                    10 Claims

ABSTRACT OF THE DISCLOSURE

A process is described for improving the yield of tetraalkylleads produced by Grignard reactions in which the conventional reaction is carried out in the presence of certain catalytic metals. Metals described are those reducible to the zero valence state by metallic lead. Specifically described are the metals copper, silver, mercury, gold, antimony, bismuth, platinum and iron. Tellurium, a semi-metal, is also disclosed. The quantities of metal employed is variable and is generally between 1 gram of metal up to about 80 grams per pound of the lead employed in the reaction.

---

This invention relates to the production of organolead compounds, especially alkyllead compounds. Specific embodiments of this invention are directed to an improved process for the manufacture of tetra lower alkyllead compounds, notably tetraethyllead and tetramethyllead.

Several processes based on the Grignard reaction have been suggested for the manufacture of alkyllead compounds. The Grignard reaction produces yields of tetraalkyllead which greatly exceed those obtainable by the alkylation of lead sodium alloy according to present day commercial practice. Thus, it is known, for example, from U.S. Patent 2,535,190 to produce alkyllead compounds by reacting lead with an alkylating agent in the presence of magnesium and an organic catalyst.

It has now been found that the yields of tetraalkylleads produced by Grignard reactions are enhanced by conducting the reactions in the presence of a catalytic amount of certain metals. The catalytic metals of this invention are those reducible to the zero valence state by metallic lead. Notable among these catalytic metals are copper, mercury and silver. Antimony, bismuth, gold, platinum, tellurium and ferric iron may also be employed. A wide range of proportions of the catalytic metals is operable. Usually about 10 to about 30, rarely more than about 80 or less than about 1 grams of the catalytic metal per pound of lead is employed.

The catalytic metals of this invention are preferably introduced in a form which exposes a large surface area of the free metal to the reactants. The catalysts may be introduced in combined form provided they are readily reduced to the free metallic state by the conditions of the reaction. Halogen salts of the catalytic metals are especially useful. The catalytic metals may also be introduced with a carrier. Thus, any of the commercially available supported catalysts which contain members of the aforedescribed class of catalytic metals may be employed.

The reaction mechanism contemplated by this invention may be expressed:

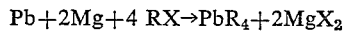

or

where R represents an alkyl or alkenyl group containing 1 to 4 carbon atoms or a phenyl group and X represents chlorine, bromine or iodine.

The lead employed may be in the form of an alloy of lead with alkali and/or alkaline earth metals. Lead sodium alloy, particularly lead monosodium alloy, is useful. Alternatively, the lead may be in the form of free lead such as commercial lead powder. The lead powder may be produced chemically, e.g., by precipitating metallic lead from solutions of lead salts. A highly desirable form of lead is the free lead produced by the alkylation of sodium lead alloy in the present day commercial process for the preparation of tetraethyllead. Any of the forms of metallic lead disclosed by the aforesaid U.S. Patent 2,535,190 may be employed.

The organomagnesium halides may be preformed and introduced to the reaction zone prior to, concurrently with, or subsequent to the introduction of the lead and organo halide. Alternatively, magnesium metal and organo halide may be introduced to the reaction zone to form organomagnesium halide in situ which then reacts with lead and additional organo halide to produce a tetraorganolead product. The organo halides, the organomagnesium halides and the tetraorganolead compounds of this invention include those which contain methyl, ethyl, propyl, butyl, vinyl and/or phenyl groups.

While in general all of the lower alkyl, aryl and alkenyl halides may be employed in this invention, the preferred alkylating agents are the iodides of these groups. Methyl iodide and ethyl iodide are particularly preferred. In general, lower yields are obtained when the bromides and/or chlorides are employed. Bromides have produced better yields than the corresponding chlorides. The process is adaptable to the production of organolead compounds such as tetraethyllead, tetramethyllead, methyltriethyllead, dimethyldiethyllead, trimethylethyllead, triethylphenyllead, tetraphenyllead, tetrapropyllead, tetrabutyllead and tetravinyllead. Other similar organo lead compounds are within contemplation.

The reaction may be carried out in the presence or absence of solvents. Suitable solvents which may be employed include the alkyl ethers, such as diethyl ether, methylethyl ether, diisopropyl ether, dibutyl ether, di-n-butyl ether, dihexyl ether, tetrahydrofuran and 1,4-dioxane. Alkyl, dialkyl and trialkyl amines such as trimethyl amine, triethyl amine and dimethyl aniline may also be employed. Alkyl halides, preferably an excess of the alkyl halides employed in the reaction, and hydrocarbon liquids inert to the reactants, preferably with a vaporization temperature in excess of that of the alkyl halide employed in the reaction are also useful solvents. Toluene is a particularly suitable liquid hydrocarbon solvent. Pentane, heptane, n-hexane and kerosene may also be employed. In general, any member of the aforementioned classes of compounds which is liquid at the temperature of reaction may be employed. Those which are liquid at ambient temperatures and pressures are more conveniently handled and are preferred for that reason.

In a typical practice of this invention, the solid materials including lead are placed in a reaction vessel such as the autoclaves of the present commercial process. If the Grignard reagent is to be formed in situ, magnesium is charged to the autoclave along with the lead. The catalytic metal, e.g., silver, copper, or mercury is conveniently placed in the autoclave with the lead. Of course, the Grignard reagent or the catalytic metal may be introduced at any other point in the process. The desired quantity of the alkylating agent such as ethyl iodide as well as any solvents employed are typically delivered to the autoclave through a fluid line.

It is within contemplation that the Grignard reagent and metallic catalyst be charged to the autoclave after the customary commercial reaction has been initiated or completed. Additional organic halide is also typically introduced to the reaction zone. In this fashion, the Grignard reaction proceeds either concurrently with or subsequent to a standard commercial alkylation of sodium lead alloy. The "commercial reaction" or "alkylation" referred to herein is typically expressed:

$$4NaPb + 4RX \rightarrow PbR_4 + 3Pb + 4NaX$$

The invention will be more readily understood with reference to the following detailed examples:

Example I

A glass reactor consisting of a 200 milliliter 3-necked round bottom flask was employed. A mechanical stirrer, a 100 milliliter dropping funnel, and a Dry Ice-acetone reflux condenser were provided to the respective necks of the flask. All of the reactor parts were dried at 115° C. for at least 8 hours. The reactor was then assembled and a stream of dry nitrogen passed through it. There were then placed in the reactor 0.05 gram-atom of lead, 0.20 gram-atom of magnesium and the desired amount of catalytic metal. These materials were covered with 30 milliliters of n-butyl ether. A solution consisting of 0.4 mole of ethyl iodide dissolved in 25 milliliters of n-butyl ether was placed in the dropping funnel. A few drops of the ethyl iodide-ether mixture were added to the reaction mixture under vigorous agitation. After an induction period of a few minutes, initiation of the reaction was evidenced by a color change of the reaction mixture. The reaction mixture passed through a bright yellow-green color to an olive-green color which persisted through most of the reaction. The reaction was quite exothermic. Periodic cooling with a Dry Ice-acetone bath was employed to keep the temperature of the mixture below about 40° C. After the initial reaction had subsided, dropwise addition of the ethyl iodide solution was continued at a rate which maintained the reaction mixture at about 40° C. Addition required from about 1 to about 2 hours. After addition of ethyl iodide was completed, a water bath was used to raise the reaction temperature to 85° C. After completion of the reaction, the reaction mixture was poured into ice water and extracted twice with toluene. About 50 milliliters of a 1:1 sodium acetate-acetic acid buffer was added to the water-toluene mixture to facilitate extraction. The toluene extracts were washed twice with water, dried, and submitted for analysis.

The lead used was commercial lead powder with a particle size of about 200 mesh. The copper was provided as powder. The silver employed was in granular form. The lead, copper and silver were dried at 115° C. for at least 8 hours prior to use. The magnesium employed was in the form of chips of high surface area.

The following table reports specific reaction conditions and yields for three runs employing copper, silver and mercury, respectively, as the catalysts:

| Catalytic metal | G.-atm. catalytic metal | Reaction time,[1] hours | Yield TEL, percent [2] |
|---|---|---|---|
| Cu | 0.003 | 2.2 | 53.2 |
| Ag | 0.003 | 2.5 | 59.1 |
| Hg | 0.009 | 1.1 | 75.2 |

[1] Total time reaction mixture was held at 85° C.
[2] Assuming a maximum reaction of 100% of the lead charged.

Example II

The procedure of Example I was repeated employing 0.025 gram atom of lead, 0.20 gram atom of magnesium, 0.20 mole of ethyl iodide, and a total of 28 milliliters of n-butyl ether. No catalytic metals were added to the reaction mass. The ethyl iodide was dissolved in about 12 milliliters of n-butyl ether. A yield of about 45.9 percent, based on 100 percent of the lead charged, was obtained.

Although the invention has been described with specific reference to certain detailed embodiments thereof, it is not intended to limit the invention to these details except insofar as they are recited in the appended claims.

I claim:
1. The process of manufacturing tetraorganolead which comprises reacting lead with organo halide in the presence of at least one member of the group consisting of magnesium and organomagnesium halides and at least one catalytic metal reduceable to the zero valent state by metallic lead selected from the group consisting of copper, mercury, silver, antimony, bismuth, gold, platinum and iron in the metallic state.
2. The process of claim 1 wherein the lead is reacted with organo halide in a reaction zone to which magnesium metal and catalytic metal have been charged.
3. The process of claim 1 wherein tetraalkyllead is produced by reacting lead with alkyl halide in the presence of at least one member of the group consisting of magnesium and alkylmagnesium halide.
4. The process of claim 1 wherein tetraalkyllead is produced by reacting lead with alkyl iodide in the presence of at least one member of the group consisting of magnesium and alkylmagnesium iodide.
5. The process of claim 3 wherein the lead is reacted with alkyl halide in a reaction zone to which magnesium metal and catalytic metal have been charged.
6. The process of claim 3 wherein tetramethyllead is produced by reacting lead with methyl halide in the presence of at least one member of the group consisting of magnesium and methylmagnesium halide and in the presence of a catalytic amount of at least one metal selected from the group consisting of silver, copper and mercury.
7. The process of claim 6 wherein tetramethyllead is produced by the reaction of lead with methyl iodide in the presence of at least one member of the group consisting of magnesium and methylmagnesium iodide.
8. The process of claim 3 wherein tetraethyllead is produced by reacting lead with ethyl halide in the presence of at least one member of the group consisting of magnesium and ethylmagnesium halide and in the presence of a catalytic amount of at least one metal selected from the group consisting of copper, silver and mercury.
9. The process of claim 8 wherein tetraethyllead is produced by reacting lead with ethyl iodide in the presence of at least one member of the group consisting of magnesium and ethylmagnesium iodide.
10. The process of claim 1 wherein the reaction is conducted in the presence of a solvent.

References Cited

UNITED STATES PATENTS

| 3,403,173 | 9/1968 | Snuffer et al. | 260—437 |
| 1,697,245 | 1/1929 | Kraus et al. | 260—437 |
| 2,414,058 | 1/1947 | Pearsall | 260—437 |
| 2,535,190 | 12/1950 | Calingaert et al. | 260—437 |
| 2,535,191 | 12/1950 | Calingaert et al. | 260—437 |
| 2,535,192 | 12/1950 | Calingaert et al. | 260—437 |
| 2,535,193 | 12/1950 | Calingaert et al. | 260—437 |
| 2,535,235 | 12/1950 | Shapiro | 260—437 |
| 2,688,628 | 9/1954 | Shapiro et al. | 260—437 |
| 3,136,795 | 6/1964 | Blitzer et al. | 260—437 |

FOREIGN PATENTS 761,844   11/1956   Great Britain.

TOBIAS E. LEVOW, Primary Examiner

H. M. S. SNEED, Assistant Examiner